(12) United States Patent
Albrecht et al.

(10) Patent No.: US 7,236,325 B2
(45) Date of Patent: Jun. 26, 2007

(54) METHOD FOR FORMATTING A MAGNETIC RECORDING DISK WITH PATTERNED NONDATA ISLANDS OF ALTERNATING POLARITY

(75) Inventors: Thomas R. Albrecht, San Jose, CA (US); Zvonimir Bandic, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 154 days.

(21) Appl. No.: 11/149,028

(22) Filed: Jun. 9, 2005

(65) Prior Publication Data

US 2006/0279871 A1 Dec. 14, 2006

(51) Int. Cl.
*G11B 5/596* (2006.01)
*G11B 5/09* (2006.01)
*G11B 21/02* (2006.01)

(52) U.S. Cl. .................. 360/77.08; 360/48; 360/51; 360/75

(58) Field of Classification Search ............... None
See application file for complete search history.

(56) References Cited

U.S. PATENT DOCUMENTS

| | | | |
|---|---|---|---|
| 4,912,585 A | 3/1990 | Belser et al. | |
| 5,587,223 A | 12/1996 | White | |
| 5,590,009 A | 12/1996 | Ishida | |
| 5,820,769 A | 10/1998 | Chou | |
| 6,128,166 A * | 10/2000 | Tanaka et al. | 360/317 |
| 6,157,511 A * | 12/2000 | Liikanen | 360/77.08 |
| 6,383,598 B1 | 5/2002 | Fullerton et al. | |
| 6,440,520 B1 | 8/2002 | Baglin et al. | |
| 6,643,082 B1 | 11/2003 | Belser | |
| 6,751,035 B1 | 6/2004 | Belser | |
| 6,853,514 B2 | 2/2005 | Li et al. | |
| 7,095,581 B2 * | 8/2006 | Tagami | 360/77.08 |
| 7,209,314 B2 * | 4/2007 | Bandic et al. | 360/78.04 |
| 2002/0048107 A1 * | 4/2002 | Bryant et al. | 360/51 |
| 2004/0252394 A1 | 12/2004 | Hamaguchi et al. | |
| 2006/0039264 A1 * | 2/2006 | Bryant et al. | 369/100 |

* cited by examiner

*Primary Examiner*—William Korzuch
*Assistant Examiner*—Daniell L. Negrón
(74) *Attorney, Agent, or Firm*—Thomas R. Berthold (57) ABSTRACT

A method for formatting a magnetic recording disk with patterned nondata islands having alternating magnetization polarity in the along-the-track direction involves clocking write pulses to switch the magnetization direction of alternate, i.e., every other, nondata island. The clocking is controlled by the previously determined phase of the regions containing the nondata islands and the known offset along-the-track between the read head and write head. In each nondata region, every other nondata island in the along-the-track direction has the same magnetization direction, with adjacent nondata islands having antiparallel magnetization directions. The disk may be either a horizontal magnetic recording disk, wherein the antiparallel magnetization directions are in the plane of the recording layer and parallel to the along-the-track direction, or a perpendicular magnetic recording disk, wherein the antiparallel the magnetization directions are "into" and "out of" the recording layer.

13 Claims, 7 Drawing Sheets

METHOD FOR FORMATTING A MAGNETIC RECORDING DISK WITH PATTERNED NONDATA ISLANDS OF ALTERNATING POLARITY

RELATED APPLICATION

This application is related to concurrently-filed co-pending application 11/148,918 filed Jun. 9, 2005 and titled "MAGNETIC RECORDING DISK WITH PATTERNED NONDATA ISLANDS OF ALTERNATING POLARITY".

BACKGROUND OF THE INVENTION

1. Field of the Invention

This invention relates generally to patterned-media magnetic recording disks, wherein each data bit is stored in a magnetically isolated data island on the disk, and more particularly to a patterned-media disk with patterned nondata islands for head-positioning and data synchronization.

2. Description of the Related Art

Magnetic recording hard disk drives with patterned magnetic recording media have been proposed to increase the data density. In patterned media, the magnetic recording layer on the disk is patterned into small isolated data islands such that there is a single magnetic domain in each island or "bit". The single magnetic domains can be a single grain or consist of a few strongly coupled grains that switch magnetic states in concert as a single magnetic volume. This is in, contrast to conventional continuous media wherein a single "bit" may have multiple magnetic domains separated by domain walls. To produce the required magnetic isolation of the patterned islands, the magnetic moment of the spaces between the islands must be destroyed or substantially reduced so as to render these spaces essentially nonmagnetic. In one type of patterned media, as described for example in U.S. Pat. No. 6,440,520, the islands are elevated regions or pillars that extend above the spaces and magnetic material covers both the islands and the spaces, but the spaces are far enough from the read/write head to not adversely affect reading or writing, so the spaces can be considered essentially nonmagnetic. Alternatively, the patterned media may be fabricated so that that there is no magnetic material in the spaces between the islands. U.S. Pat. Nos. 5,820,769; 5,587,223; and 6,383,598 are representative of various types of patterned media and their methods of fabrication.

Like conventional non-patterned or continuous-media disks, patterned-media disks also have nondata regions that are used for read/write head positioning and data synchronization. The nondata regions in patterned-media disks contain nondata islands separated by nonmagnetic spaces. The proposed method for formatting this type of disk is to DC "erase" the disk during manufacturing with a large magnet, leaving all of the nondata islands magnetized in the same direction. Thus for a patterned-media perpendicular magnetic recording disk, all of the nondata islands would have a magnetization direction either "into" or "out of" the surface of the disk. However, because only a single polarity of magnetization is used with this method, half of the available signal amplitude from the nondata islands is sacrificed and thus the signal-to-noise ratio (SNR) is less than optimum.

What is needed is a patterned-media magnetic recording disk with nondata islands that have alternating polarity of magnetization to provide optimal SNR, and a relatively fast and low-cost method for formatting the disk.

SUMMARY OF THE INVENTION

The invention is a method for formatting a magnetic recording disk with patterned nondata islands having alternating magnetization polarity in the along-the-track direction. The nondata regions include generally equally angularly spaced servo sectors that extend generally radially across all the data tracks of the disk and generally equally angularly spaced synchronization fields that extend only across the data tracks in their corresponding annular data zones. In each nondata region, every other nondata island in the along-the track direction has the same magnetization direction, with adjacent nondata islands having antiparallel magnetization directions. The disk may be either a horizontal magnetic recording disk, wherein the antiparallel magnetization directions are in the plane of the recording layer and parallel to the along-the-track direction, or a perpendicular magnetic recording disk, wherein the antiparallel the magnetization directions are "into" and "out of" the recording layer. Also, the disk may be either a continuous-media disk with just the nondata regions being patterned, or a patterned-media disk with both patterned data islands and patterned nondata regions. If the disk is a continuous-media disk it may also be a "discrete-track" disk in which the concentric data tracks of continuous media are radially separated from one another by concentric nonmagnetic guard bands.

In one method for formatting the disk, the disk is first DC-magnetized so that all nondata islands have the same magnetization direction. The disk is then placed on a spindle and rotated past a read/write head having a radial width of many tracks. The read head detects the signal from the angularly spaced nondata regions and determines the phase of the signal relative to the known rotation of the spindle. The read/write head is then positioned to the disk inner or outer diameter and the disk is rotated to begin formatting. The read head detects a nondata region and generates a start signal. The write head then clocks write pulses to the next nondata region to switch the magnetization direction of alternate, i.e., every other, nondata island in that region. The clocking is controlled by the start signal and from the previously determined phase and the known offset along-the-track between the read head and write head. This continues for one revolution of the disk, with every other nondata region generating a start signal that controls the clocking of write pulses in the next nondata region. After one revolution of the disk every other nondata region in the annular band corresponding to the radial width of the write head has been "written", i.e., every other nondata island in the written nondata region has had its magnetization direction switched. Then during the second revolution of the disk, the previously written nondata regions are used to generate the start signals so that the remaining nondata regions can be written by clocking of write pulses in the same manner. After two revolutions of the disk an annular band corresponding to the radial width of the write head has been formatted. The read/write head is then moved radially a distance less than its radial width, e.g., half its radial width, and the process repeated as the read/write head makes a spiral path on the disk surface.

For a fuller understanding of the nature and advantages of the present invention, reference should be made to the following detailed description taken together with the accompanying figures.

DETAILED DESCRIPTION OF THE INVENTION

Prior Art

Figure 1A:
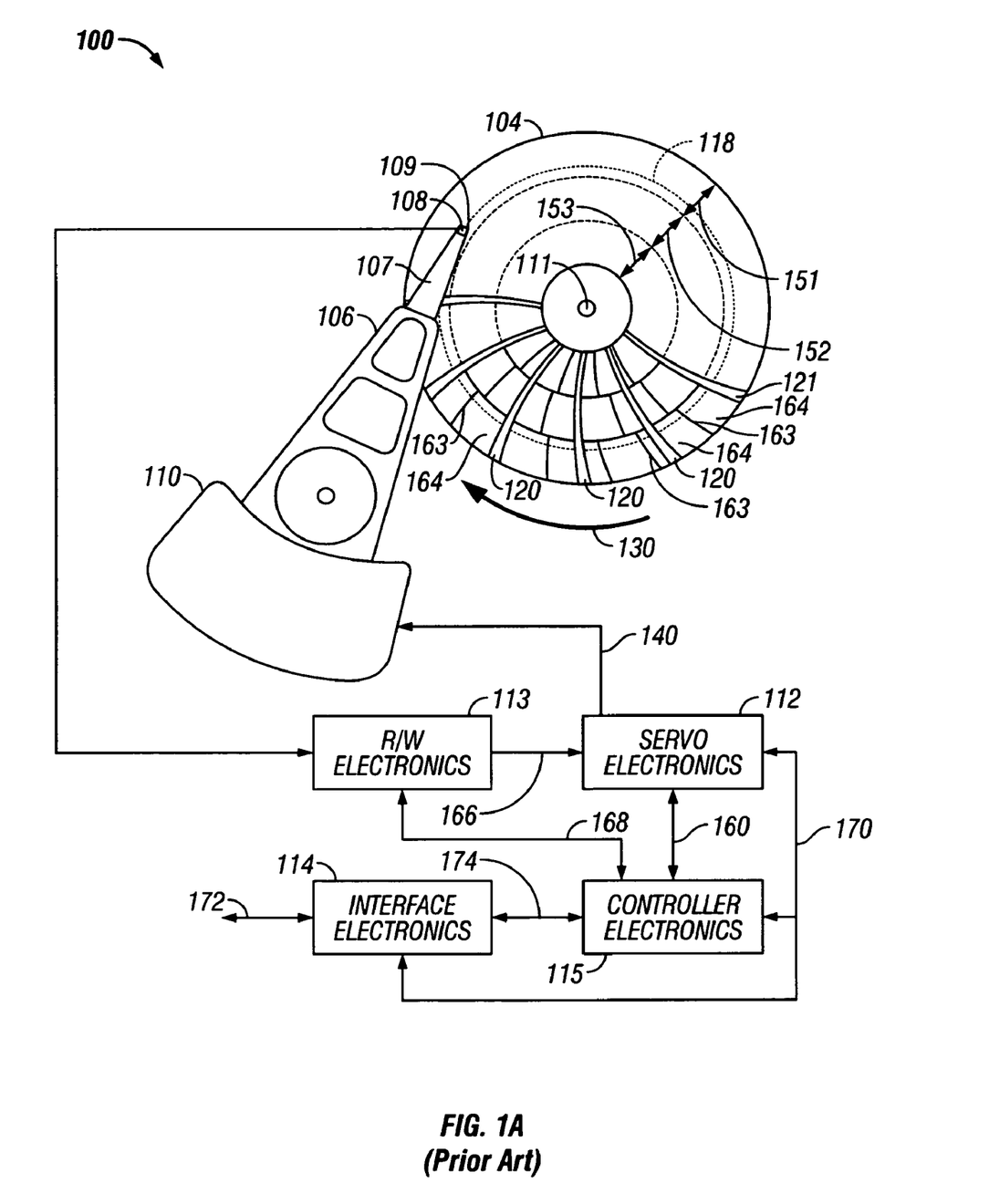
FIG. 1 is a schematic of a conventional magnetic recording disk drive illustrating the magnetic recording disk with nondata servo sectors and synchronization fields.

FIG. 1 is a schematic of a conventional magnetic recording disk drive and illustrates the magnetic recording disk with the nondata regions, specifically the servo sectors for positioning the recording heads on the data tracks and the synchronization fields for enabling the recording heads to read and write data in the data sectors. The disk drive, designated generally as 100, includes the magnetic recording disk 104, a voice coil motor (VCM) actuator 110, an actuator arm 106, a suspension 107, a head carrier or air-bearing slider 108 and a recording head 109. The recording head 109 is typically a combination of an inductive write head with a magrietoresistive read head (also called a read/write head) and is located on the trailing end or end face of slider 108. Slider 108 is supported on the actuator arm 106 by a suspension 107 that enables the slider to "pitch" and "roll" on an air-bearing generated by the disk 104 as it rotates in the direction of arrow 130. Only one disk surface with associated slider and recording head is shown in FIG. 1, but there are typically multiple disks stacked on a hub that is rotated by a spindle motor, with a separate slider and recording head associated with each surface of each disk.

Figure 2:
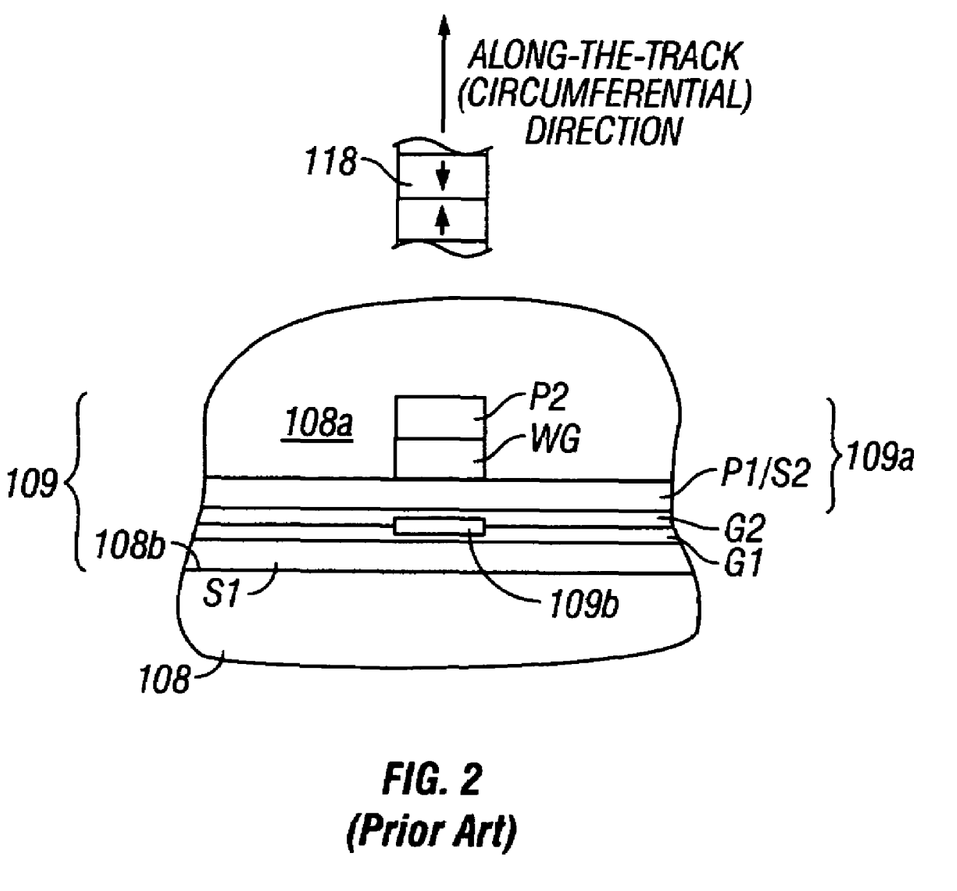
FIG. 2 is a view showing the disk-facing surface the disk-drive slider with the ends of the read/write head and a portion of a data track as viewed from the surface of the disk.

FIG. 2 is a view showing the disk-facing surface 108a of slider 108 and the ends of head 109 as viewed from the surface of disk 104 superimposed with a portion of data track 118. The head 109 is a read/write head and is a series of thin films deposited and lithographically patterned on the end face 108b of slider 108. The write head 109a includes magnetic write poles P1/S2 and P1 separated by a write gap WG. When write current is directed to the write head 109a a magnetic field is generated across WG in a direction along the data track 118. The magnetoresistive sensor or read head 109b is located between two insulating gap layers G1, G2. Gap layers G1, G2 are located between magnetic shields S1 and P1/S2, with P1/S2 also serving as the first write pole for the write head 109a. Because shield S2 also serves as the pole P1, this type of read/write head 24 is known as a "merged" head. If S2 and P1 are separate layers the read/write head is known as a "piggyback" head. Because the films making up head 109 are deposited sequentially on end face 108b of slider 108, there is a spacing D in the along-the-track or circumferential direction between the read head 109b and the write gap WG of write head 109a. The write head 109a depicted in FIG. 2 is a horizontal-recording write head for recording magnetizations in the plane of the recording layer on disk 104, as shown by the arrows in the section of data track 118. However, the write head may also be a perpendicular-recording write head with a perpendicular write pole (WP) that records magnetizations perpendicular to the recording layer on disk 104.

Referring again to FIG. 1, the disk 104 has a center of rotation 111 and is rotated in direction 130. The disk 104 has a magnetic recording layer with radially-spaced concentric data tracks, one of which is shown as track 118. Each data track has a reference index 121 indicating the start-of-track. The disk drive is illustrated as a zone-bit-recording (ZBR) disk drive because the data tracks are grouped radially into a number of annular data zones, three of which are shown as zones 151, 152 and 153, but the invention is fully applicable to a disk drive that does not use ZBR, in which case the disk drive would have only a single data zone. Within each zone, the tracks are also circumferentially divided into a number of data sectors, such as typical data sectors 164 in the radially outer data zone. Each data sector 164 is preceded by a synchronization (sync) field, such as typical sync fields 163. The sync fields 163 are detectable by the read head for enabling synchronization of reading and writing the data bits in the data sectors 164. In conventional disk drives, a sync field is a nondata region on the disk that is magnetized each time data is written in its associated data sector.

Each data track also includes a plurality of circumferentially or angularly-spaced servo sectors 120 that contain positioning information detectable by the read head for moving the head 109 to desired data tracks and maintaining the head 109 on the data tracks. The servo sectors in each track are aligned circumferentially with the servo sectors in the other tracks so that they extend across the tracks in a generally radial direction, as represented by radially-directed servo sectors 120. The servo sectors 120 are nondata regions on the disk that are magnetized once, typically during manufacturing or formatting of the disk, and are not intended to be erased during normal operation of the disk drive.

The electronics associated with disk drive 100 include read/write (R/W) electronics 113, servo electronics 112, controller electronics 115 and interface electronics 114. In the operation of disk drive 100, the R/W electronics 113 receives signals from head 109 and passes servo information from the servo sectors 120 to servo electronics 112 and data signals from the data sectors 164 to controller electronics 115. Servo electronics 112 uses the servo information to produce a current at 140 that drives VCM actuator 110 to position head 109. Interface electronics 114 communicates with a host system (not shown) over interface 172, passing data and command information. Interface electronics 114 also communicates with controller electronics 115 over interface 174. In the operation of disk drive 100, interface electronics 114 receives a request for reading from or writing to the data sectors 164 over interface 172. Controller electronics 115 receives a list of requested data sectors from interface electronics 114 and converts them into a set of numbers that uniquely identify the disk surface, track and data sector. The numbers are passed to servo electronics 112 to enable positioning head 109 to the appropriate data sector.

If the disk drive is a "headerless" architecture disk drive, meaning that the data sectors 164 do not contain unique data sector addresses that are required to be read before data can be read from or written to the data sectors, then once the servo electronics 112 has positioned head 109 over the appropriate data track, servo electronics 112 begins executing sector computations to locate and identify the desired data sector. In brief, in the headerless architecture approach, a servo timing mark (STM) at the beginning of the servo sectors 120 is used to locate servo sectors, and a count of STMs from a servo sector containing an index mark 121 uniquely identifies each servo sector. Once the desired data sector is thus identified, the sync field preceding that data sector is detected to control the timing of data bits read from the data sector or data bits written to the data sector.

Conventional magnetic recording disk drives use disks with "continuous" media, meaning that the magnetic recording layer is a continuous film of magnetizable material. In conventional continuous-media disks the concentric data tracks are not physically separated from one another and are not pre-formed in the recording layer, but are formed when the write fields from the write head create the magnetizations in the continuous magnetic layer. A continuous-media disk may also be a "discrete-track" disk, meaning that the concentric data tracks of continuous magnetic material are radially separated from one another by concentric nonmagnetic guard bands. Discrete-track magnetic recording disks are known in the art, as described for example in U.S. Pat. No. 4,912,585. In a discrete-track disk, the nonmagnetic guard bands may be trenches or grooves, or formed of nonmagnetic material, or contain magnetic material but have surfaces far enough below the surfaces of the data tracks to not adversely the readback signals from the data tracks.

However, magnetic recording disks with "patterned" media have been proposed to increase the data density. In patterned media, the magnetizable material on the disk is patterned into small isolated islands such that there is a single magnetic domain in each island or "bit". The single magnetic domains can be a single grain or consist of a few strongly coupled grains that switch magnetic states in concert as a single magnetic volume. This is in contrast to conventional continuous media wherein a single "bit" may have multiple magnetic domains separated by domain walls. To produce the required magnetic isolation of the patterned islands, the magnetic moment of the spaces between the islands must be destroyed or substantially reduced so as to render these spaces essentially nonmagnetic. In one type of patterned media, as described for example in U.S. Pat. No. 6,440,520, the islands are elevated regions or pillars that extend above the spaces and magnetic material covers both the islands and the spaces, but the spaces are far enough from the read/write head to not adversely affect reading or writing, so the spaces can be considered essentially nonmagnetic. Alternatively, the media may be fabricated so that there is no magnetic material in the spaces between the islands.

In patterned media, the data sectors as well as the nondata regions are patterned. However, it is also possible to fabricate a continuous-media disk wherein just the nondata regions are patterned. This type of continuous-media disk may have either conventional concentric data tracks, or discrete data tracks separated by nonmagnetic guard bands, but the nondata regions are patterned. An example of a discrete-track disk with patterned servo regions is described in U.S. Pat. No. 4,912,585.

Figure 3:
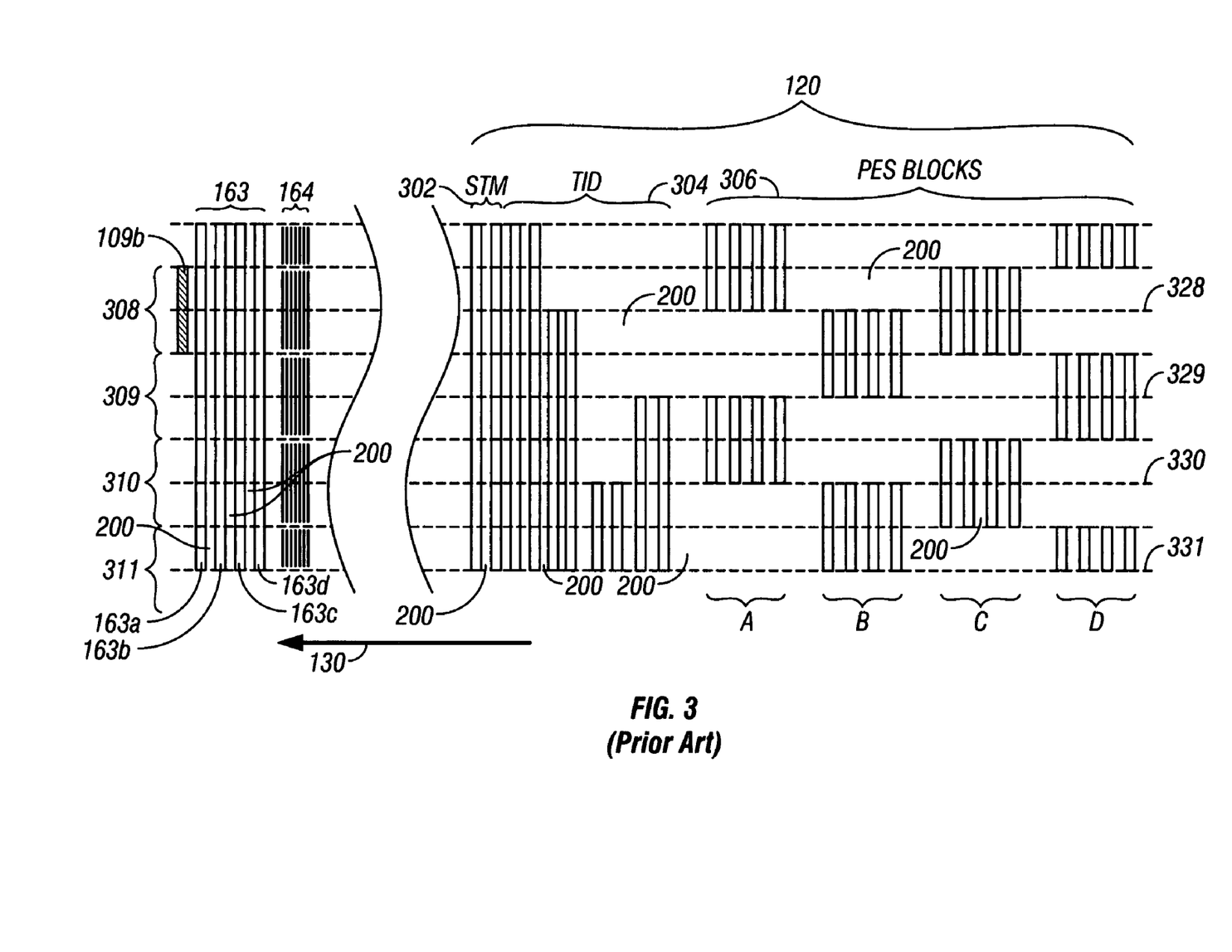
FIG. 3 is a schematic showing a portion of a patterned-media disk with a patterned sync field and a patterned servo sector spanning several data tracks, as proposed in the prior art.

FIG. 3 is a schematic showing a portion of a patterned-media disk with a patterned sync field 163 and a patterned servo sector 120 spanning several data tracks, as proposed in the prior art. Four full data tracks are depicted: 308, 309, 310 and half-track 311, each having a respective track centerline 328,329,330 and 331. The read head 109b is shown as positioned in data track 308 and will detect the islands in sync field 163 and servo sector 120 as the disk rotates in the direction of arrow 130.

The sync field 163 is depicted with four sync marks as magnetized nondata islands 163a-163d separated by nonmagnetic spaces. The sync marks are stripes that extend across the data tracks in the radial direction, resulting in a single-frequency pattern suitable for locking a phase-locked-loop data clock prior to reading or writing data bits in the data sectors. The sync field 163 precedes the data sector 164, which shows several data islands, represented as solid lines.

The servo sector 120 is a conventional servo pattern of the type commonly used in sector servo systems and shows a greatly simplified pattern for clarity. The servo pattern includes several fields containing nondata islands, three of which are shown as servo-timing-mark (STM) field 302, track ID (TID) field 304 and position-error-signal (PES) field 305 depicted as the well-known quadrature pattern of PES islands A-D. The PES islands A-D are used to determine the fractional part of the radial position of the head. When the head is at the track centers the read-back signal amplitudes from the A islands and the B islands are equal. When the head is at the half-track positions the amplitudes from the C islands and the D islands are equal. As the head moves off-track the amplitudes from all the islands will increase or decrease. The amplitudes of the PES islands are decoded in servo electronics 112 and used to reposition the head.

In FIG. 3 all of the islands in sync field 163, data sector 164 and servo sector 120 are discrete islands of magnetic material and are magnetized in the same direction, either perpendicular to the recording layer (either into or out of the paper in FIG. 3) for perpendicular-recording media, or in the plane of the recording layer (either to the right or left in the along-the-track direction in FIG. 3) for horizontal-recording media. The islands are typically DC-magnetized by a large magnet during manufacturing. Each discrete island is a magnetized island separated from other islands by nonmagnetic spaces represented as 200. The term "nonmagnetic" means that the spaces 200 between the islands are formed of a nonferromagnetic material, such as a dielectric, or a material that has no substantial remanent moment in the absence of an applied magnetic field, or a magnetic material in a groove or trench recessed far enough below the islands to not adversely affect reading or writing. The nonmagnetic spaces 200 may also be the absence of magnetic material, such as grooves or troughs in the magnetic recording layer or disk substrate.

As shown schematically in FIG. 3, the nondata islands (sync field 163 and servo sector 120) have a frequency substantially lower than the data islands (data sector 164). This is because for a given resolution of the read head 109b, a modern partial-response (PR) read channel in RIW electronics 113 can handle linear bit densities with a period several times greater than the resolution of the read head.

However, to clearly resolve individual pulses, which is beneficial for data synchronization and PES decoding, the period of the nondata islands should be close to the resolution of the read head.

Figure 4A:
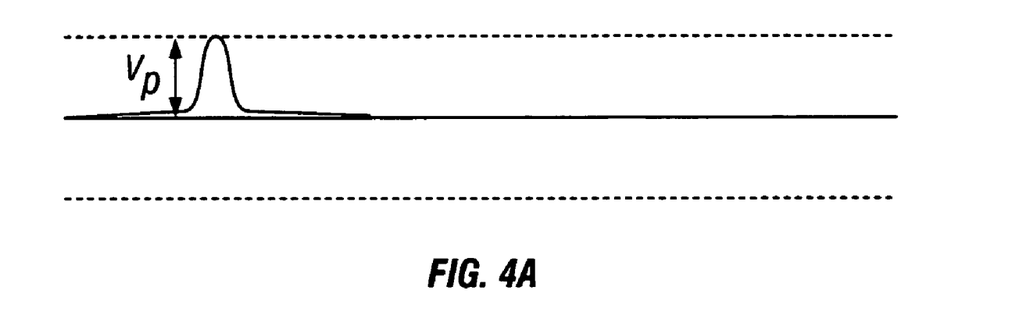
FIG. 4(a) is a representative signal from a single perpendicularly magnetized nondata island.
Figure 4B:
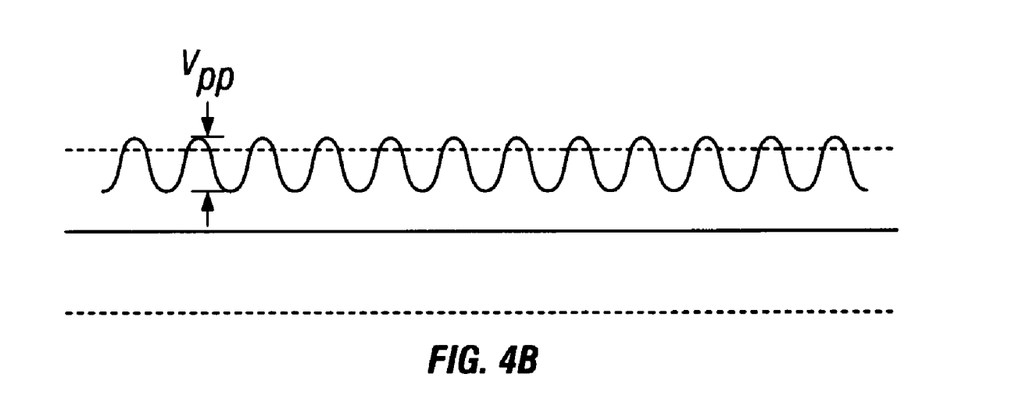
FIG. 4(b) is a representative signal from a series of nondata islands with all islands being DC-magnetized in the same perpendicular direction so that their magnetizations have a single polarity.

FIG. 4(a) is representative of the signal detected by read head 109b as a single magnetized nondata island of FIG. 3 passes the read head. The isolated pulse response $V_p$ shown is for a perpendicularly-magnetized island. If the nondata islands repeat with a certain period, and all islands are DC-magnetized in the same perpendicular direction so that their magnetizations have a single polarity, then a series of pulses as shown in FIG. 4(b) will be detected by read head 109b. Note that the peak-to-peak amplitude $V_{pp}$ is smaller than the isolated pulse response $V_p$.

The Invention

Figure 5:
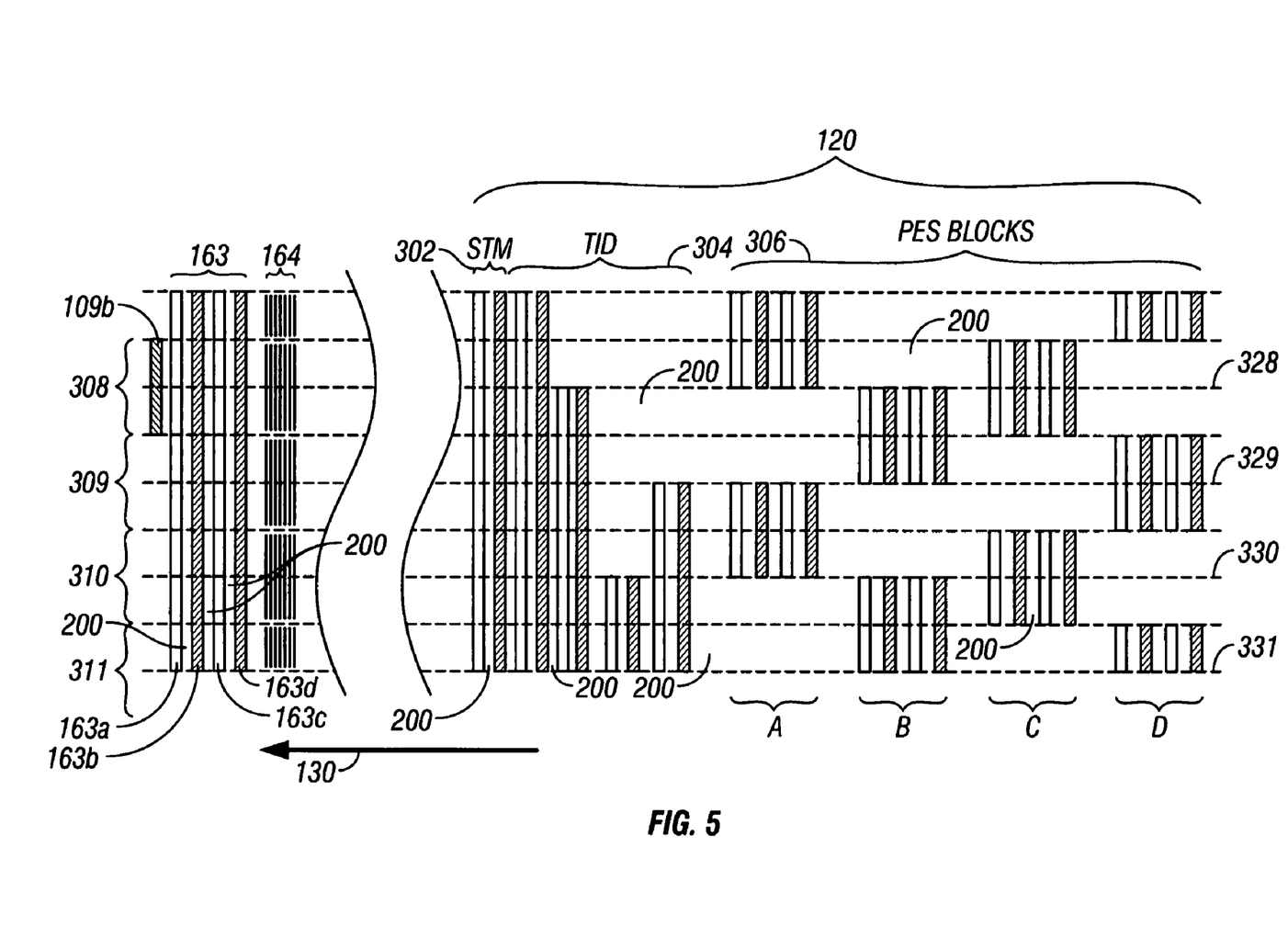
FIG. 5 is a schematic showing a portion of a patterned-media disk with a patterned sync field and a patterned servo sector spanning several data tracks, according to the present invention.

This invention is a magnetic recording disk, and a method for making it, that has an improved pattern of nondata islands that provide a significantly improved signal response from the prior art represented by FIG. 4(b). FIG. 5 is a schematic showing a portion of a patterned media disk with a patterned sync field 163 and a patterned servo sector 120 spanning several data tracks, according to this invention. The pattern is similar to that shown in FIG. 3, except that alternating islands (shown with cross-hatching) are magnetized in the opposite direction to the magnetization of the other islands. Thus the magnetizations in the non-cross-hatched islands are antiparallel to the magnetizations in the cross-hatched islands. For perpendicular recording, if the magnetizations in the non-cross-hatched islands are out-of-the paper in FIG. 5, then the magnetizations in the cross-hatched islands would be into-the-paper. For horizontal recording, if the magnetizations in the non-cross-hatched islands are to the right in the along-the-track direction in FIG. 5, then the magnetizations in the cross-hatched islands would be to the left.

Figure 4C:
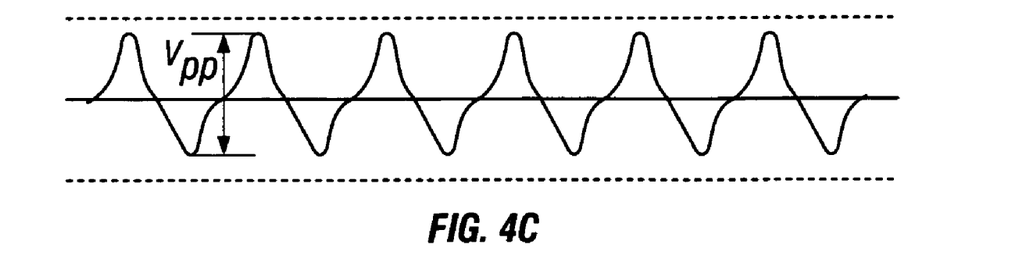
FIG. 4(c) is a representative signal from a disk according to the present invention with the nondata islands having alternating perpendicular magnetization directions so that two adjacent islands along a track have opposite polarity.

If the nondata islands in FIG. 5 repeat with a certain period, and are magnetized in the alternating perpendicular directions so that two adjacent islands will have opposite polarity, then a series of pulses as shown in FIG. 4(c) will be detected by read head 109b. Note that the peak-to-peak amplitude $V_{pp}$ in FIG. 4(c) is more than double the peak-to-peak amplitude $V_{pp}$ in FIG. 4(b). If most of the noise in the recording system is not data-dependent, and therefore constant between the examples of FIGS. 4(b) and 4(c), then the signal-to-noise ratio will be significantly better for the example of FIG. 4(c) with alternating polarity. Because the instantaneous signal-to-noise ratio can be traded off against the length of the pattern, it will be possible to achieve the desired performance targets with shorter data sync and servo patterns, leaving more disk real estate for data sectors.

The method for forming the pattern of nondata islands as shown in FIG. 5 begins with a disk having the previously patterned but non-magnetized nondata islands. This disk may be a patterned-media disk with both pre-patterned data islands and pre-patterned nondata islands, a continuous-media disk with conventional continuous-media data tracks and pre-patterned data islands, or a continuous-media disk with discrete data tracks and pre-patterned data islands. There are various well-known techniques for fabricating such disks. All islands on the disk are then DC-magnetized in one direction. One method to accomplish this is to sweep a permanent magnet over the entire disk surface, such as by moving the magnet radially while the disk is rotating on a spindle. The disk would then have the prior art pattern as shown in FIG. 3.

To format the pattern of alternating nondata islands with magnetization in the opposite direction requires that the magnetization of these islands be switched, which requires that the exact position of the islands on the disk (frequency and phase relative to the spinning disk) be known. This is accomplished as described below and will be explained first for magnetizing alternating nondata islands in the servo sectors.

The DC-magnetized disk is placed on a spindle and the read head of a wide-track read/write head (with known spacing or offset between the read head and the write head) is used to detect the magnetic signal from the islands as the disk rotates. For a perpendicular recording disk, the read head will detect pulses of a single polarity, like that depicted in FIG. 4(b). In the regions of data islands, little or no signal will be present due to the hexagonal close-pack arrangement of the data islands, which results in roughly a constant flux through the read head. If the data islands are arranged in a square grid, a low amplitude signal at the data island frequency may be detected due to limited read-head resolution. However, in the servo sectors a significantly larger amplitude signal will appear at the lower frequency of the nondata islands. Even though the islands in the servo sectors consist of finite-length radial stripes (for the TID fields), the wide-track read head will detect roughly constant-amplitude pulses by averaging over many features along every radial stripe.

Since the patterns of nondata islands can never be perfectly concentric with the spindle on which the disk is spinning, there will necessarily be repeatable "runout", which will cause the frequency and phase of every pulse to differ slightly from a perfectly periodic signal. Thus the phase of each pulse is detected by the read head as the disk spins, and the repeatable phase modulation is measured and characterized. Suitable parameters are stored so that the write signals to magnetize the alternating nondata islands can be modulated in a feed-forward manner to match the phase modulation of the patterns.

Figure 6A:
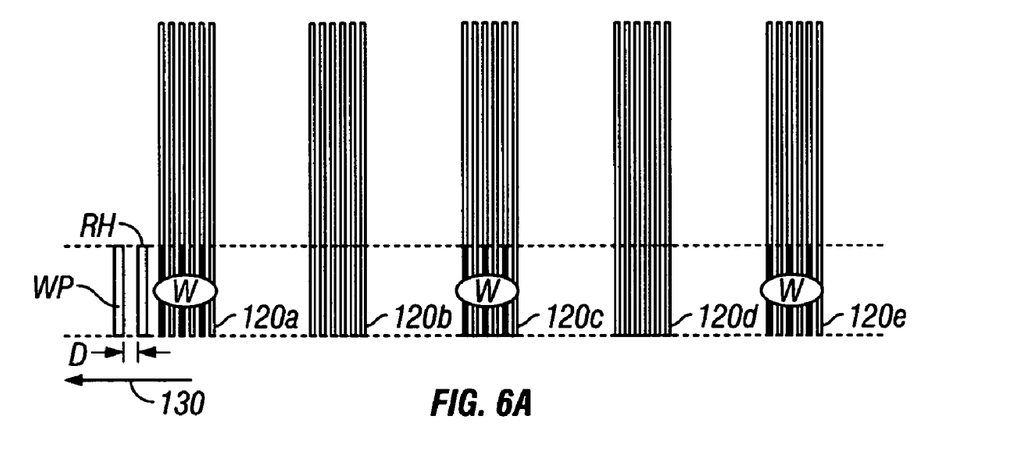
FIGS. 6(a) to 6(c) illustrate the method of the present invention for formatting angularly consecutive servo sectors using a wide-track read/write head.
Figure 6B:
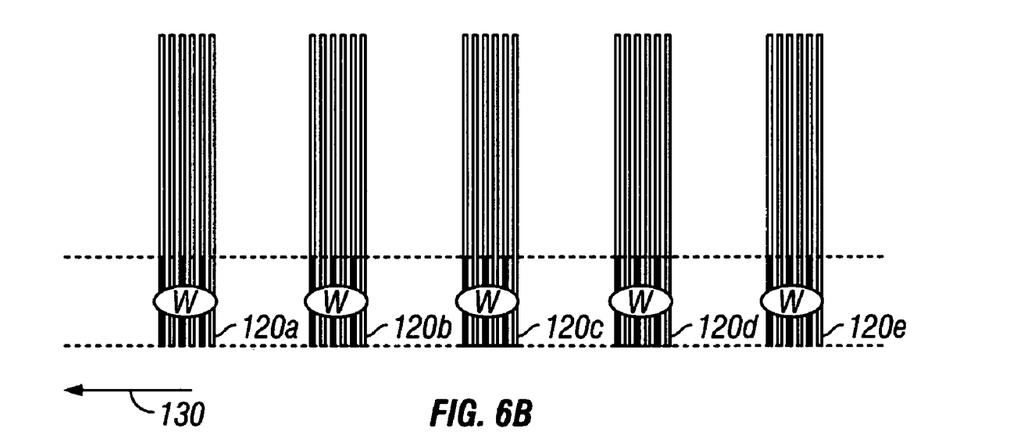
Figure 6C:
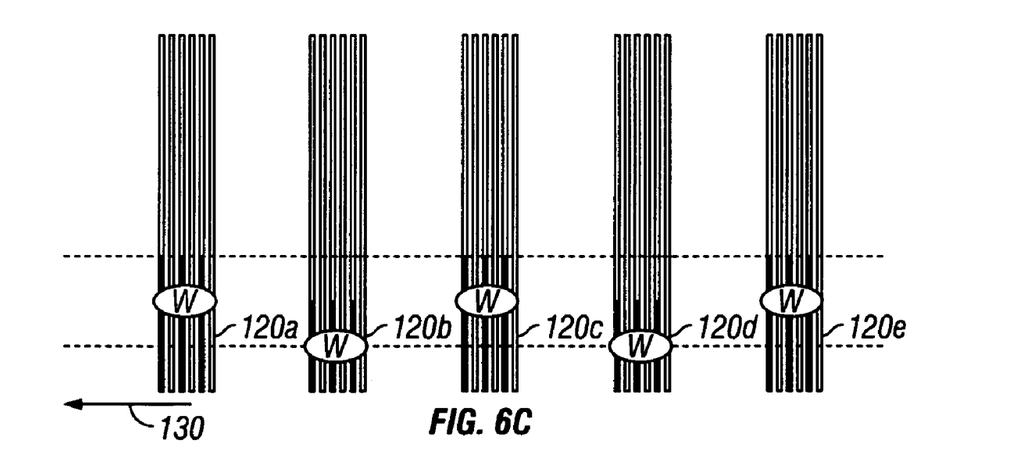

Next the read head detects the signal from every other servo sector, and uses the previously measured phase information, and the known read head/write head offset, to write the alternating nondata islands in the intervening servo sectors. In this manner, the phase information has aged only by the time needed to pass from one servo sector to the next. To establish one fully written track, two revolutions of the disk are needed because only half the servo sectors are written per revolution. Within an individual servo sector that is being written, only half of the islands have their magnetizations altered from the previously DC-magnetized direction. FIGS. 6(a) to 6(c) illustrate the write process for five angularly consecutive servo sectors 120a-120e wherein the 'W' indicates the servo sectors that have been written. The horizontal dashed lines indicate the radial width of the write head, which can be many tracks wide.

Referring first to FIG. 6(a), the disk rotates in the direction 130 past the wide-track read head RH and the wide-track write head (represented as the write pole WP of a perpendicular recording head), with WP being offset from RH by a distance D. The signal pulses from the DC-magnetized radial stripes (the DC-magnetized islands from the all of the tracks under the wide-track read head) in servo sector 120b generate a constant sync signal, which is detected by RH and used as a start signal to time the writing of the alternate islands in the immediately following servo sector 120c by WP. The timing is calculated from the previously measured and stored phase modulation information and from the known offset D between the RH and WI).

In the same manner, the signal from servo sector 120*d* is used to write the alternate islands in servo sector 120*e*. After the first revolution of the disk, the servo sectors would appear as shown in FIG. 6(*a*).

On the second revolution of the disk, the remaining servo sectors are written, using the same process. For example, the signal pulses from the DC-magnetized radial stripes in servo sector 120*a* generate a constant sync signal, which is detected by RH and used to time the writing of the alternate islands in the immediately following servo sector 120*b* by WP. After the second revolution of the disk, the servo sectors would appear as shown in FIG. 6(*b*).

After the second revolution of the disk, the read/write head is moved radially a distance less the radial width of the head, e.g., by half the head width, for each subsequent revolution. This "spiral" motion of the read/write head provides for maximum throughput because the writing process is not interrupted, but proceeds continuously as the read/write head is moved radially. FIG. 6(*c*) shows how the servo sectors would appear after the read/write head has been moved radially by half the head width and the next disk revolution has occurred. For example, additional portions of servo sectors 102*a*, 120*c* and 120*e* will have been written. The writing process proceeds in this manner until all of the servo sectors on the entire disk surface have had their alternating islands magnetized.

The above description has focused only writing alternating islands in the servo sectors. However, alternating islands in the sync fields also need to be magnetized. This is accomplished by a parallel set of electronics driving the write head in a manner similar to that described for the servo sectors. While the servo sectors have a constant frequency over the entire disk, the sync fields change from data zone to data zone (see FIG. 1). Because of this, it is necessary to interrupt the sync field writing process at each data zone boundary, with two revolutions on a fixed starting track and a fixed ending track to establish the circular (not spiral) boundaries of each data zone.

Figure 7:
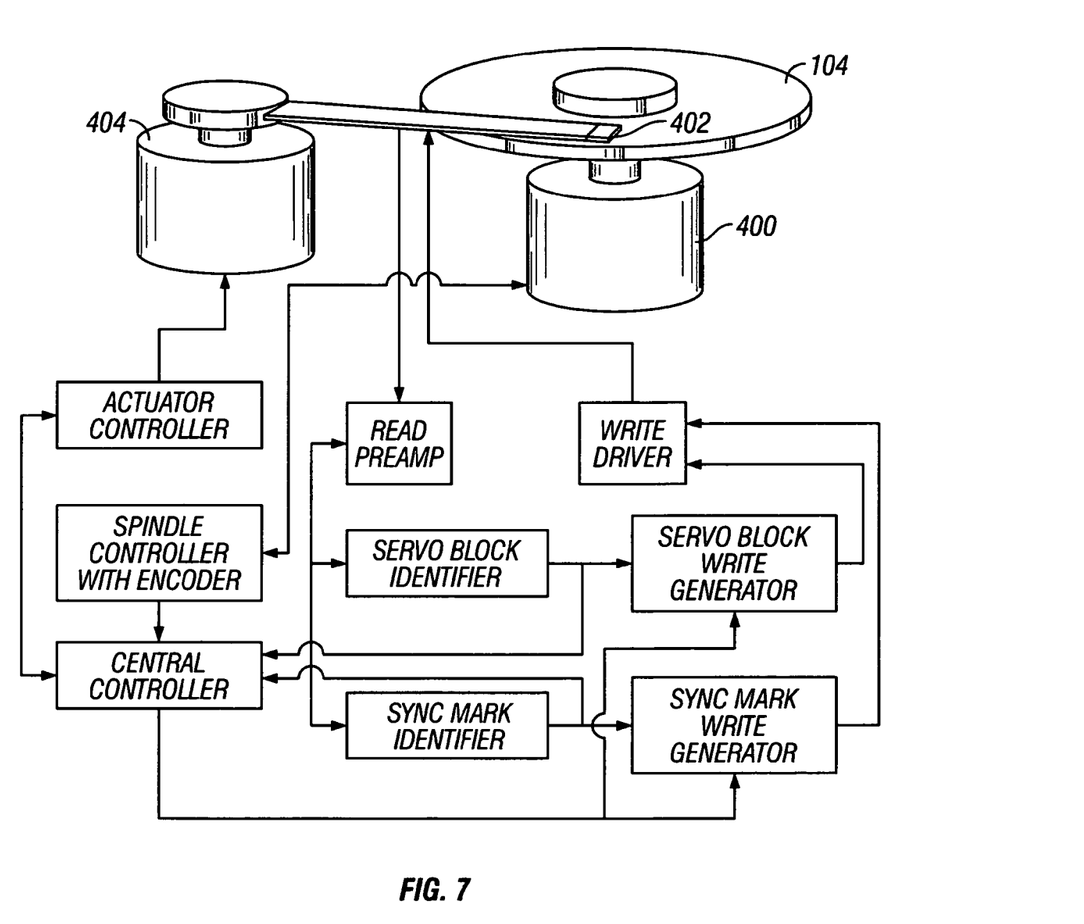
FIG. 7 is a island diagram of an apparatus for formatting the disk with nondata islands magnetized according to the present invention using the method of the present invention.

A island diagram of the apparatus used to accomplish the above-described formatting process is shown in FIG. 7. The disk 104 to be formatted is mounted on an air-bearing spindle 400 that has very low non-repeatable runout and a fine line rotational encoder to assist with speed control and synchronization. The wide-track read/write head 402 with an air-bearing surface is maintained above the rotating disk. The head 402 is mounted on a rotary actuator 404 that has closed-loop rotary position control accurate to a small fraction of the angle that corresponds to a track width at the head 402. Only one head 402 is shown, but a duplicate head would be maintained on the other surface of disk 104, and a duplicate set of read/write and control electronics would be provided so that both surfaces of the disk would be formatted simultaneously. The phase of nondata islands on the top and bottom surfaces of the disk are likely to be randomly aligned. There may also be eccentricity differences between the top and bottom surfaces, which can be compensated by providing independent runout correction for the electronics driving the two independent heads. The formatting may also occur in a "pack formatter" where multiple disks are mounted on a common spindle, and multiple heads are mounted on a common actuator. With sufficient redundancy in the electronics, many disk surfaces can be formatted simultaneously.

The read head detects the nondata islands from the rotating disk 104 and the detected pulses are amplified by the read preamp. The read preamp provides an analog signal of the readback pulses to a servo island identifier and a sync mark identifier. The servo island identifier identifies the exact position (phase) of servo islands, which have fixed frequency and phase over all data zones. The sync mark identifier identifies the exact position of sync marks, which vary in frequency and phase from data zone to data zone. A number of known techniques may be used to perform this detection, such as use of a matched filter. The servo island and sync mark identifiers in turn trigger write generators for both the servo islands and the sync marks. The write signals from these write generators are input to the analog write driver that applies appropriate current pulses to the write head to generate the magnetic fields for switching the magnetizations in the alternate servo islands and sync marks. A central controller receives signals from the servo island and sync mark identifiers and the spindle controller and coordinates the timing of the write generators, such that every other servo island and sync mark are read for synchronization purposes, and the intervening servo islands and sync marks, respectively, are written.

The actuator controller has closed-loop absolute position control (using an interferometer or high-resolution encoder) to position the read/write head 402 at the desired radius on the disk 104. The actuator can be set up to have sufficient absolute alignment and calibration to the disk radius to position the head correctly for the boundaries of each data zone, or real-time corrections can be made by using the read head to detect the data zone boundaries by recognizing the unique sync field frequency for each data zone.

There are several variations of the system that can handle different types of servo patterns. For arbitrary servo patterns that do not have all pattern features following single-phase radial stripes, a read/write head with a narrower radial width is used so that the pattern features are all in phase within the width of the head. Patterns can even be written at the level of a single track per revolution, or even a fraction of a track per revolution as in conventional servowriting, although this would result in a longer formatting time. The read and write heads do not need to be as narrow as the tracks or partial tracks being written, since "shingling", i.e., overwriting part of one track on a subsequent revolution, can be used.

Since it is not required to use a wide-track head if the formatting time is of a lesser concern, the formatting can take place within the finished disk drive using the drive's read/write head. In this approach the disks are DC-magnetized prior to installation into the drive. The half-amplitude servo signals available from the DC-magnetized servo islands are used to guide the head track-by-track, or at the partial track level, over all the tracks on each disk surface. The synchronization for final magnetization of the alternating nondata islands is as described above. Performing the formatting operation within the drive allows for the possibility of self-formatting, in which the drive's own controller, or an inexpensive external electronic controller, accomplishes the formatting operation.

Certain servo patterns are made up of features that fall into two sets of angular features. For example, for a "phase" type servo pattern, the servo islands include one set of stripes at one azimuthal orientation relative to the track, and another set of stripes at a different azimuthal orientation. For cases where the features fall into a small number of such orientations, and all features within each set are in phase, an approach using multiple heads on each disk surface is used. For example, for a typical phasing servo pattern, one read/write head has the normal orientation as discussed above and writes all of the sync marks as well as one set of the servo stripes. A second head with a different azimuthal orientation writes the other set of servo stripes. It may be necessary to use redundant but coordinated electronics to control the two heads per surface.

The above-described method wherein alternating nondata islands in one sector or field are written by first reading the nondata islands in the preceding sector or field is a relatively low-cost method that does not require expensive and complex high-precision disk formatting equipment, and that can also be performed in the drive. However, the disks can also be formatted with formatting equipment that includes a spindle with a very high resolution rotary encoder, with angular resolution sufficient to clearly distinguish the position of every nondata island on disk. With such equipment, it is only necessary to determine the phase and runout of the disk relative to the spindle, using the procedure described above. Once these parameters have been established, all of the alternate nondata islands on the disk can be magnetized opposite to the previously DC-magnetized direction using frequency and phase information from the encoder alone, with no need to read servo sectors or sync fields prior to writing. Since writing may continue without interruption, there is no need to skip every other servo sector or sync field while writing, and the total time to magnetize the entire disk can be reduced by half from the previously-described method. An annular region of the disk equal to the full radial width of the write head can be magnetized with each revolution of the disk.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for magnetizing discrete islands of magnetizable material in a magnetic recording disk that has a recording layer of magnetizable material for the recording of data in a plurality of generally concentric circular data tracks, and a plurality of nondata regions spaced along the tracks, each nondata region patterned into discrete nondata islands of magnetizable material separated by nonmagnetic spaces, all of the islands being magnetized in a first direction, the method comprising:
   providing a read head for detecting the islands and a write head for magnetizing the islands;
   rotating the disk past the write head; and
   clocking write pulses to the write head to switch the magnetization in alternate islands in the along-the-track direction from said first direction to a direction substantially antiparallel to said first direction.

2. The method of claim 1 wherein rotating the disk comprises rotating the disk with a spindle motor having a rotary encoder providing angular position information of the disk and wherein clocking the write pulses comprises controlling the clocking from the angular position information.

3. The method of claim 2 further comprising, prior to clocking the write pulses, rotating the disk past the read head and determining the phase of the spaced nondata regions, and wherein clocking the write pulses comprises controlling the clocking from the previously determined phase of the nondata regions.

4. The method of claim 2 wherein the read head is offset from the write head in the along-the-track direction, and wherein clocking the write pulses comprises controlling the clocking from the offset.

5. The method of claim 1 wherein the nondata regions comprise angularly spaced servo sectors extending generally radially across a plurality of data tracks and the nondata islands comprise servo islands, the method further comprising:
   detecting alternate servo sectors during rotation of the disk; and
   wherein clocking the write pulses comprises clocking the write pulses in the servo sectors in-between the servo sectors detected by the read head.

6. The method of claim 1 wherein the nondata regions comprise angularly spaced sync fields extending generally radially across a plurality of data tracks and the nondata islands comprise sync marks, the method further comprising:
   detecting alternate sync fields during rotation of the disk; and
   wherein clocking the write pulses comprises clocking the write pulses in the sync fields in-between the sync fields detected by the read head.

7. The method of claim 1 wherein switching the magnetization in alternate islands comprises switching the magnetization from a first direction substantially in the plane of the recording layer to an antiparallel direction substantially in the plane of the recording layer.

8. The method of claim 1 wherein switching the magnetization in alternate islands comprises switching the magnetization from a first direction substantially perpendicular to the plane of the recording layer to an antiparallel direction substantially perpendicular to the plane of the recording layer.

9. A method for magnetizing discrete nondata islands of magnetizable material in a magnetic recording disk that has a recording layer of magnetizable material patterned into a plurality of generally concentric circular data tracks, each data track containing discrete data islands of magnetizable material separated by nonmagnetic spaces, and a plurality of nondata regions spaced along the tracks, each nondata region patterned into discrete nondata islands of magnetizable material separated by nonmagnetic spaces, all of the nondata islands being magnetized in a first direction substantially perpendicular to the plane of the recording layer, the method comprising:
   providing a read head for detecting the nondata islands and a write head for switching the magnetization direction of the magnetized nondata islands, the read head being offset from the write head in the along-the-track direction;
   detecting the magnetized nondata islands from all of the nondata regions as the disk rotates past the read head to determine the phase of the nondata regions; and thereafter
   rotating the disk past the read head and write head;
   detecting the magnetized nondata islands from a first nondata region, the read head thereby generating a start signal;
   clocking write pulses to the write head to switch the magnetization in alternate nondata islands in the nondata region immediately adjacent to said first nondata region, said clocking comprising controlling the clocking from said start signal and said previously determined phase and read head/write head offset.

10. The method of claim 9 wherein the read head has a radial width greater than a single track width, whereby the start signal is generated from nondata islands in a plurality of tracks.

11. The method of claim 9 wherein the write head has a radial width greater than a single track width, whereby the magnetization is switched in the nondata islands of a plurality of tracks.

12. The method of claim 9 wherein the nondata regions comprise angularly spaced servo sectors extending generally radially across a plurality of data tracks and the nondata islands comprise servo islands.

13. The method of claim 9 wherein the nondata regions comprise angularly spaced sync fields extending generally radially across a plurality of data tracks and the nondata islands comprise sync marks.

* * * * *